United States Patent [19]

Takahashi et al.

[11] 4,420,333

[45] * Dec. 13, 1983

[54] POWDERY DESULFURIZER COMPOSITION

[75] Inventors: Atsushi Takahashi, Tokyo; Yoshiharu Muratsubaki, Uozu; Hiroyuki Ishizaka, Mitaka, all of Japan

[73] Assignee: Nippon Carbide Kogyo Kabushiki Kaisha, Tokyo, Japan

[ * ] Notice: The portion of the term of this patent subsequent to Jul. 20, 1999 has been disclaimed.

[21] Appl. No.: 260,884

[22] Filed: May 6, 1981

[30] Foreign Application Priority Data

May 10, 1980 [JP] Japan .................................. 55-61261

[51] Int. Cl.³ .............................................. C21C 7/02
[52] U.S. Cl. .......................................... 75/55; 75/57; 75/58
[58] Field of Search ......................... 75/52, 55, 57, 58

[56] References Cited

U.S. PATENT DOCUMENTS

| | | | |
|---|---|---|---|
| 3,598,573 | 8/1971 | Freissmuth et al. | 75/53 |
| 3,954,446 | 5/1976 | Miyaoka et al. | 75/53 |
| 3,999,978 | 12/1976 | Furuya et al. | 75/53 |
| 4,049,442 | 9/1977 | Freissmuth et al. | 75/58 |
| 4,137,295 | 1/1979 | Tamprs | 423/442 |
| 4,194,902 | 3/1980 | Gmolling | 75/55 |
| 4,260,413 | 4/1981 | Freissmuth et al. | 75/53 |
| 4,263,043 | 4/1981 | Haida et al. | 75/58 |
| 4,266,969 | 5/1981 | Koros | 75/58 |
| 4,340,422 | 7/1982 | Takahashi et al. | 75/58 |

FOREIGN PATENT DOCUMENTS

| | | |
|---|---|---|
| 49-1967 | 1/1974 | Japan . |
| 49-6454 | 2/1974 | Japan . |
| 49-31518 | 3/1974 | Japan . |
| 50-102515 | 8/1975 | Japan . |
| 54-38209 | 3/1979 | Japan . |
| 54-50414 | 4/1979 | Japan . |
| 54-86416 | 7/1979 | Japan . |
| 54-86417 | 7/1979 | Japan . |
| 1237259 | 6/1971 | United Kingdom ................... 75/55 |

*Primary Examiner*—Gary P. Straub
*Attorney, Agent, or Firm*—Sherman & Shalloway

[57] ABSTRACT

A powdery desulfurizer composition for injection desulfurization of molten iron, said composition comprising 30 to 90% by weight of quicklime and 70 to 10% by weight of diamide lime.

10 Claims, No Drawings

POWDERY DESULFURIZER COMPOSITION

BACKGROUND OF THE INVENTION

1. Field of the Invention

This invention relates to a powdery desulfurizing agent comprising quicklime and diamide lime as main ingredients. More specifically, the invention pertains to a powdery desulfurizer composition comprising quicklime and diamide lime as main ingredients, which is especially effective in injection desulfurization of molten iron.

The diamide lime is a mixture consisting essentially of calcium carbonate and carbon.

The term "molten iron" as used herein, denotes a molten mass of pig iron, cast iron, steel, etc.

2. Description of the Prior Art

As is well known, desulfurization of molten iron is an important treatment for obtaining iron and steel products having excellent properties, and numerous desulfurizing agents and desulfurizing methods have been proposed heretofore.

Calcium carbide has excellent desulfurizing ability, and desulfurizers comprising calcium carbide as a main ingredient have gained widespread acceptance. Production of calcium carbide, however, entails high electric power consumption, and it has been desired to re-assess calcium carbide as a desulfurizer from an economical viewpoint in order to cope with the recent rise in energy cost. On the other hand, quicklime is known as one of cheaper desulfurizers. Although the industry desires commercial utilization of quicklime, its very low desulfurizing performance has made it difficult to meet various high-level requirements in the present-day desulfurization of molten iron.

A method which comprises adding a powdery desulfurizing agent to molten iron and mechanically stirring the mixture and a method which comprises injecting a powdery desulfurizing agent into molten iron using a carrier gas are well known for desulfurization of molten iron. The injection desulfurizing method has gained widespread acceptance because of its excellent operational ease and desulfurizing efficiency. Specifically, the injection desulfurizing method comprises carrying a powdery desulfurizing agent on a stream of a carrier gas such as dry nitrogen, and injecting it into molten iron through a lance submerged in molten iron. According to a widely accepted practice of injection desulfurization, a torpedo car which has received molten pig iron from a blast furnace, for example, is stopped for a while at a desulfurizing station on its way to a steel-making factory, and a powdery desulfurizing agent is injected into molten iron in the torpedo car during this stop. Furthermore, injection desulfurization in an open ladle has been put into operation in recent years in place of the mechanically stirring desulfurizing method (e.g., the so-called KR method in an open ladle) because of its excellent operational ease and desulfurizing efficiency.

The term "injection desulfurization", as used in the present application, is a term contrastive with "desulfurization methods which involve pre-addition of sulfurizers or mechanical stirring", and specifically denotes a method of desulfurization which comprises injecting a powdery desulfurizing agent together with a carrier gas into molten iron beneath its surface.

The injected desulfurizing agent by the injection desulfurizing method escapes from the carrier gas in molten iron and makes contact with the molten iron, whereupon it reacts with sulfur in the molten iron. Then, the desulfurizing agent and/or its reaction product with sulfur rise through the molten iron and finally float as a desulfurization slag on the surface of the molten iron. The molten iron is sufficiently moved and stirred by the carrier gas and/or gases which may be evolved from gas-generating substances in the powdery desulfurizing agent, and as a result, the chances of the desulfurizer to encounter sulfur in molten iron is enhanced, and the residual sulfur content in the molten iron is geometrically uniform.

In this mechanism of desulfurization, the following three factors may be recited as among the most influential upon desulfurization performance.

1. Reactivity of the powdery desulfurizing agent.
2. The area of contact between the powdery desulfurizing agent and the molten iron.
3. Distribution of the concentration of sulfur in molten iron during desulfurization.

Methods for improving the desulfurizing ability of quicklime have been proposed, for example, in Japanese Laid-Open Patent Publications Nos. 38209/1979, 50414/1979, 86416/1979, and 86417/1979 which are directed mainly to size reduction of CaO crystals constituting quicklime so as to increase its contact area and thereby improve its reactivity. It has been found, however, that when quicklime treated by the methods disclosed in these prior patent documents is used in injection desulfurization of molten iron, its transportability on a stream of a carrier gas is very poor, a large amount of the carrier gas is required, and therefore injection of the quicklime in high concentration and fine dispersion in the carrier gas is difficult, and consequently that the advantage of the finely divided CaO crystals cannot be utilized and the expected desulfurizing effect cannot be obtained. It has also been found that if the particle diameter of the quicklime is further decreased, its transportability on a carrier gas is further reduced to cause various troubles in injection desulfurization. It is thus seen that although the reduction of the particle size of a desulfurizing agent has greatly to do with an increase in desulfurizing ability, its desulfurizing performance is not directly governed by its particle size, and also it is greatly affected by the transportability of the desulfurizing agent on a carrier gas.

In the injection desulfurizing method, the powdery desulfurizing agent is injected into molten iron in a form suspended in a carrier gas. That part of the powdery desulfurizing agent which has escaped from the gas bubbles of the gas stream makes direct contact with the molten iron and reacts with sulfur in the molten iron, but that portion of the desulfurizing agent which remains enclosed within the gas bubbles rises as such and floats on the surface of the molten iron without contributing to the desulfurizing reaction or spurts out of the molten iron together with the gas.

In order to increase the proportion of the desulfurizer powder which participates in the desulfurization reaction and to increase its reactivity, it is desirable to minimize the amount of the carrier gas, thereby preventing the desulfurizing agent from being enclosed within the gas bubbles. The amount of the carrier gas required for injection, however depends upon the gas transportability of the powdery desulfurizing agent, and a desulfurizing agent which has poor gas transportability requires a large amount of a carrier gas for injection. Accordingly, even a desulfurizing agent having high reactivity cannot give the desired desulfurizing effect in injection desulfurization if its transportability on a carrier gas is poor.

On the other hand, if the particle size of the powdery desulfurizing agent is increased, the surface area of particles per unit weight decreases and therefore, its desulfurizing effect is also reduced.

Furthermore, when the desulfurizing agent has poor gas transportability, great fluctuations occur in the concentration of the desulfurizing agent in the carrier gas in injection desulfurization to cause a pulsating movement of the desulfurizer-carrier gas stream which frequently becomes an operational trouble. For example, injection of an excessively large amount of the powdery desulfurizing agent into molten iron at a time results in an excessively large amount of gas evolution at a time in the molten iron and thus increases vibration of a torpedo car, an open ladle, etc. The fluctuations in the concentration of the desulfurizing agent also can result in the desulfurizing agent blocking up the lance and pipes, or the molten iron splashing vigorously out of the torpedo car and thus causing undesirable phenomena such as the pollution of the working environment.

SUMMARY OF THE INVENTION

The present inventors have undertaken various investigations in order to improve the performance of quicklime in injection desulfurization with special attention to the poor gas transportability of quicklime, and unexpectedly found that a powdery desulfurizing composition comprising a specified amount of powdery quicklime and a specified amount of powdery diamide lime gives a complete solution to the aforesaid various problems associated with quicklime.

It is an object of this invention to provide a quicklime-containing powdery desulfurizer composition for use in injection desulfurization of molten iron, which is low in cost and fully utilizes the desulfurizing ability of quicklime.

According to this invention, there is provided a powdery desulfurizer composition for use in injection desulfurization of molten iron, said composition comprising 30 to 90% by weight of quicklime and 70 to 10% by weight of diamide lime.

In a preferred embodiment, the composition of this invention further comprises not more than 20 parts by weight of a carbonaceous material and/or 2 to 8 parts by weight of a desulfurization aid, particularly fluorspar, per 100 parts by weight of the quicklime and diamide lime combined.

DETAILED DESCRIPTION OF THE INVENTION

The "quicklime", as used in the present application, denotes lime containing calcium oxide in an amount of at least 60% by weight, preferably at least 70% by weight, more preferably at least 80% by weight, most preferably at least 90% by weight.

Quicklime is generally obtained by calcining lime materials containing calcium carbonate as a main component, such as limestone, calcite, marble and shells of shellfish in such a thermal decomposition device as a vertical kiln fired by heavy oil, gases or their mixtures, or a rotary kiln, and is supplied in suitable degrees of purity and suitable extents of calcining depending upon the end uses. For industrial use, there are, for example, quicklime for steel-making, quicklime for chemical industry (production of calcium carbide, bleaching agents and paper pulp), quicklime for agriculture, and quicklime for construction work. Usually, quicklime is marketed as special grade (CaO content 90% by weight or more), first grade (CaO content 80% or more), second grade (CaO content 70% by weight or more), and third grade (CaO content 60% by weight or more). Quicklime of any of these grades can be used in the desulfurizer composition of this invention. However, the quicklime containing calcium oxide in an amount of at least 60% by weight, preferably at least 70% by weight, more preferably at least 80% by weight, most preferably at least 90% by weight can be used in this invention.

The term "diamide lime", as used in this invention, denotes a mixture of fine calcium carbonate and carbon precipitated from an aqueous solution or aqueous suspension by a chemical reaction. A typical example of the "diamide lime" is a by-product filtration residue in the production of dicyandiamide. In this process, an aqueous suspension of calcium cyanamide is reacted with carbon dioxide gas and cyanamide is extracted. The filtration residue obtained generally contains 70 to 90% by weight of calcium carbonate, 5 to 15% by weight of carbon and impurities such as iron oxide, aluminum oxide, silicon oxide and magnesium oxide. In the production of thiourea from calcium cyanamide, a similar by-product is obtained. Thus, generally, filtration residues obtained in the extraction of cyanamide from calcium cyanamide have much the same composition.

The quicklime and diamide lime and a carbonaceous material to be described hereinbelow preferably have a particle size of mainly not more than 60 microns. In the present application, the expression "mainly not more than 60 microns" means that the proportion of particles having a particle diameter of not more than 60 microns is at least 80% by weight, preferably at least 90% by weight, and in particular, the proportion of particles having a particle diameter of not more than 40 microns is at least 80% by weight, preferably at least 90% by weight. If the particle diameter is mainly above 60 microns, the particles are too coarse to secure good gas transportability, and thus, the concentration of the desulfurizing agent in the carrier gas during injection can fluctuate greatly, and the desulfurizing ability of quicklime cannot be fully utilized.

The powdery desulfurizer composition of the invention comprises 30 to 90% by weight of quicklime and 10 to 70% by weight of diamide lime, and preferably 50 to 90% by weight of quicklime and 50 to 10% by weight of diamide lime. If the amount of the diamide lime is less than 10% by weight, the gas transportability of the powdery desulfurizer composition is poor, and the desulfurizing ability of quicklime cannot be fully utilized.

When the amount of the diamide lime is at least 10% by weight, the powdery desulfurizer composition exhibits good gas transportability. The transportability increases with an increase in the proportion of diamide lime added. However, as the amount of the diamide lime increases, the amount of the quicklime decreases. Consequently, the desulfurizing ability of the powdery desulfurizer composition decreases and the amount of gases evolved increases to cause eventually splashing of the molten iron. Accordingly, the amount of the diamide lime should be limited to not more than 70% by weight. In view of the gas transportability of the desulfurizer composition and the desulfurizing performance of the quicklime, the proportion of diamide lime in the composition of the invention is preferably at least 10% by weight but not exceeding 50% by weight. The desulfurizer composition of the invention containing such a proportion of diamide lime shows a particularly good effect in injection desulfurization.

The desulfurizer composition of the invention can be injected with a carrier gas into molten iron by using known devices such as a device adapted to feed the powdery desulfurizer in specified portions down from its tank into an injection pipe line by means of a rotary valve and transport it on the carrier gas (e.g., Japaneses Laid-Open Patent Publication No. 102515/1975), or a device adapted to fluidize the powdery desulfurizer placed in a pressure vessel and inject it by using the carrier gas.

The desulfurizer composition of this invention is suitable for use in many injection desulfurization methods using various devices including the aforesaid devices. Even when a relatively large amount of the carrier gas is used as in Japanese Patent Publications Nos. 6454/1974 and 1967/1974 in which the proportion of the amount of the carrier gas is about 100 Nl per kilogram of the powdery desulfurizer composition, the desulfurizer composition of the invention can be used by properly selecting the injection angles or lance declinations, the number of injection places, the geometrical locations of injection, etc.

The "apparatus for dispensing a flowable solid material from a pressure vessel" disclosed in Japanese Laid-Open Patent Publication No. 31518/1979 is one of especially preferred injection devices which leads to full utilization of the effect of the powdery desulfurizer composition of this invention. This device has gained widespread commercial acceptance because it permits injection into molten iron of the powdery desulfurizing agent in high concentrations. If the amount of the carrier gas per unit amount of the powdery desulfurizer is small, the total amount of the carrier gas required for injection can be small. Accordingly, the degree of temperature lowering of molten iron is small, and the apparatus can be small-sized. In injection desulfurization using this type of the device, the proportion of the carrier gas can be suitably not more than 10 Nl, preferably 2 to 10 Nl, for example 5 Nl, per kilogram of the powdery desulfurizer composition. At such a low carrier gas proportion, the gas transportability of the powdery desulfurizer composition is of utmost importance. The powdery desulfurizer composition of this invention having excellent gas transportability is most effective under such conditions.

Accordingly, the powdery desulfurizer composition of the invention is suitable for use in an injection desulfurizing method particularly the one which comprises fluidizing the powdery desulfurizer composition in a pressure vessel, and injecting it into molten iron using a carrier gas in an amount of not more than 10 Nl per kilogram of the desulfurizer composition.

The present inventors have also found unexpectedly that when fine quicklime is produced by calcining diamide lime, and this quicklime is used in combination with diamide lime, the resulting composition has more improved gas transportability and further improved desulfurizing ability.

Japanese Laid-Open Patent Publications Nos. 50414/1979 and 86417/1979 cited above disclose that by calcining diamide lime under special conditions, quicklime having good desulfurizability can be obtained. However, calcining of diamide lime to obtain the aforesaid quicklime does not require any special calcining conditions although no clear reason can be assigned. Quicklime obtained by calcining diamide lime until its CaO content reaches at least 60% by weight, preferably at least 70% by weight, more preferably at least 80% by weight, most preferably at least 90% by weight can be used with good results in injection desulfurization of molten iron. However, fluidized calcination under oxygen-excessive atmosphere can be used preferably to produce the quicklime for this invention.

The quicklime obtained by calcining diamide lime may be mixed in any desired proportions which quicklimes from other more conventional lime sources. But since the quicklime obtained by calcining of diamide lime imparts better gas transportability and greater desulfurizing ability, it is preferred to use 30 to 90% by weight of quicklime having a particle diameter of mainly not more than 60 microns obtained by calcining diamide lime and 70 to 10% by weight of diamide lime having a particle diameter of mainly not more than 60 microns.

In accordance with this invention, it has also been found that when not more than 20 parts by weight, preferably 3 to 15 parts by weight, of a carbonaceous material is added to 100 parts by weight of a powdery desulfurizer composition composed of quicklime and diamide lime, the resulting mixture shows more improved gas transportability and desulfurizing ability suitable for use in desulfurization of molten iron.

Examples of the carbonaceous material are graphite, coal, coke, petroleum coke, and charcoal. There is no particular restriction on its kind and properties. It is desirable however that such a carbonaceous material should have a low sulfur content and a low water content so as to use it with quicklime. Coal and coke are preferred carbonaceous materials in view of their ready availability and low cost. The carbonaceous material desirably has a particle diameter of mainly not more than 60 microns as stated hereinabove.

If the amount of the carbonaceous material exceeds 20 parts by weight per 100 parts by weight of the powdery desulfurizer composition composed of quicklime and diamide lime, the amount of the carbonaceous material in exhaust gases from, for an example, an open ladle in the injection desulfurization process increases to cause various working environmental troubles such as higher exhaust gas temperature, flushing danger, and/or an increased amount of carbon monoxide.

The powdery desulfurizer composition for molten iron of this invention is inexpensive and exhibits excellent desulfurizing performance in injection desulfurization with effects comparable to calcium carbide. Its desulfurizing effect can be further improved by using it in combination with various conventional desulfurizing agents and desulfurization aids. Examples of these conventional materials include calcium carbide, calcium cyanamide, fluoride compound such as fluorspar, or cryolite, the oxides, hydroxides, carbonates or other compounds of sodium, magnesium or aluminum, calcium hydroxide, powders of synthetic resins, and compounds capable of liberating water or hydrogen in the desulfurization system. Fluorspar and cryolite are preferred, and fluorspar is especially preferred. The amount of fluorspar and the other conventional materials mentioned above is 2 to 8 parts by weight, preferably 3 to 6 parts by weight, per 100 parts by weight of the desulfurizer composition composed of quicklime and diamide lime. In addition to increasing the desulfurizing ability of the desulfurizer composition further, fluorspar permits easy removal of the slag after desulfurization. The reason for this is not entirely clear, but it is theorized that fluorspar prevents adhesion of calcium silicate to the surface of the lime powder, and decreases the viscosity of the slag.

When the amount of fluorspar and the other conventional materials exceeds 8 parts by weight, refractories will be heavily damaged, and if it is less than 2 parts by weight, the degree of improvement of desulfurizing ability and slag removability is small.

Fluorspar which may be used in this invention contains about 80 to about 90% by weight of $CaF_2$ and up to about 15% by weight of $SiO_2$, $Fe_2O_3$, MgO, etc.

The following Examples and Comparative Examples illustrate the present invention more specifically.

EXAMPLES 1 TO 14 AND COMPARATIVE EXAMPLES 1 TO 7

In each run, the various materials shown in Table 1 or 2 were mixed uniformly in an inert atmosphere to form a powdery desulfurizer composition.

The powdery desulfurizer composition was injected at a rate of 80 to 150 kg/min. through a lance into a torpedo ladle having a capacity of 350 T filled with 300 to 330 T of molten iron having a sulfur content of 0.032 to 0.040% by means of the injection device described in Japanese Laid-Open Patent Publication No. 31518/1974 using dry nitrogen gas as a carrier gas.

The results of the desulfurization are shown in Tables 1 and 2.

The amounts of quicklime [(quicklime)$_1$DL, (quicklime)$_2$DL, or (quicklime)*], and diamide lime in Tables 1 and 2 are by weight % based on the total amount of these two components, and the amounts of the carbonaceous material and fluorspar are expressed by parts by weight per 100 parts by weight of the quicklime and diamide lime combined.

The materials used in these examples were as follows:

(1) Quicklime

Quicklime suitable for calcium carbide production, which has a CaO content of 95%.

(2) Diamide lime

Diamide lime obtained as a by-product in the production of dicyandiamide from calcium cyanamide. Its chemical composition is: $CaCO_3$ 85% by weight, C 10% by weight, $SiO_2$ 1.8% by weight, $Al_2O_3$ 1.3% by weight, $Fe_2O_3$ 0.8% by weight, MgO 0.7% by weight, and others 0.4% by weight.

(3) (Quicklime)$_1$DL

Obtained by calcining the diamide lime mentioned in paragraph (2) above in the fluidized state at 1000° C. for 30 seconds in an excess of air using CO gas as a fuel. Its chemical composition is: CaO 72% by weight, $CaCO_3$ 23% by weight, C 1.5% by weight, $SiO_2$ 1.4% by weight, $Al_2O_3$ 0.9% by weight, and others 1.2% by weight.

(4) (Quicklime)$_2$DL

The diamide lime mentioned in paragraph (2) above was calcined under the same conditions as in (3) above except that the calcining time was changed to 45 seconds. The chemical composition of the product was: CaO 90% by weight, $CaCO_3$ 2.1% by weight, C 0.3% by weight, $SiO_2$ 2.7% by weight, $Al_2O_3$ 1.7% by weight, $Fe_2O_3$ 1.0% by weight, and others 2.2% by weight.

(5) (Quicklime)*

The quicklime obtained by calcining the diamide lime under the calcining conditions described in Table 1, Example, Calcination No. 4 of the specification of Japanese Laid-Open Patent Publication No. 86417/1979, i.e. in a nitrogen gas atmosphere at 950° C. for 60 seconds.

(6) Carbon

Obtained by pulverizing commercially available coke. It has a carbon content of 86% by weight.

(7) Fluorspar

Obtained by pulverizing imported fluorspar in the same way as in the preparation of the carbonaceous substance. This fluorspar had the following chemical composition: $CaF_2$ 90% by weight, $SiO_2$ 8.5% by weight, $Fe_2O_3$ 1.0% by weight, and MgO 0.3% by weight.

(8) Synthetic diamide lime

Obtained by uniformly mixing 88% by weight of calcium carbonate pulverized to a size of less than 60 microns and 12% by weight of coke pulverized to a size of less than 60 microns.

The particle size distributions (%) of the quicklime, diamide lime, (quicklime)$_1$DL, (quicklime)$_2$DL, (quicklime)* and carbon used in these examples were as tabulated below.

| Size | Quicklime | Diamide lime | (Quicklime)$_1$DL | (Quicklime)$_2$DL | Carbon |
|---|---|---|---|---|---|
| 70 mesh and larger sizes | 2.0 | 1.0 | 1.5 | 0.5 | 1.0 |
| 70–145 | 1.0 | 0.5 | 0.5 | 0.5 | 0.5 |
| 145–250 | 1.5 | 1.0 | 1.0 | 1.0 | 1.5 |
| 250–350 | 2.5 | 0.5 | 0 | 0.5 | 0.5 |
| 350 mesh and smaller sizes | 93.0 | 97.0 | 97.0 | 97.0 | 96.5 |

The particle size of (quicklime)* was such as more than 85% passing a 145 mesh sieve.

The terms used in Tables 1 and 2 have the following meanings.

(a) Unit consumption $$\frac{\text{Weight (kg) of the powdery desulfurizer composition injected into molten iron treated}}{\text{Weight (T) of molten iron}}$$

(b) Carrier gas ratio $$\frac{\text{Flow rate (Nl/min.) of the carrier gas}}{\text{Injecting rate (kg/min.) of the powdery desulfurizer composition}}$$

(c) Injecting pressure

The pressure (kg/cm$^2$) of the carrier gas to be connected to the discharging exit point when the desulfurizer composition is carried on the carrier gas into molten iron and injected (corresponding to a relatively low pressure P3 connected to the discharge opening 4 in FIG. 2 of Japanese Laid-Open Patent Publication No. 31518/1979).

(d) Desulfurizing ability $$\frac{S_1 - S_2 (= \Delta S)}{\text{Unit consumption}}$$

$S_1$ = sulfur content (%) of molten iron before desulfurization $S_2$ = sulfur content (%) of molten iron after desulfurization (e) Desulfurization rate $$\frac{S_1 - S_2}{S_1} \times 100 \, (\%)$$

COMPARATIVE EXAMPLE 8

Desulfurization was carried out under the same conditions as in Examples 1 to 9 except that a powdery desulfurizer composition composed of 60% by weight of (quicklime)₁DL and 40% by weight of diamide lime and 25 parts by weight, per 100 parts by weight of the quicklime and diamide lime combined, of carbon was used. During the injection operation, the temperature of the exhaust gas became exceedingly high, and the operation was too dangerous to perform. Thus, this composition cannot be used for practical purposes.

TABLE 1

| Example (Ex.) or Comparative Example (CEx.) | Desulfurizing composition | | | | | Desulfurizing conditions S content of molten iron before desulfurization ($S_1$) % |
|---|---|---|---|---|---|---|
| | Quicklime Wt. % | Quicklime)₁ DL wt. % | (Quicklime)* wt. % | Diamide lime wt. % | Carbonaceous material parts by weight | |
| Ex. 1 | 90 | | | 10 | | 0.035 |
| Ex. 2 | 60 | | | 40 | | 0.038 |
| Ex. 3 | 30 | | | 70 | | 0.032 |
| Ex. 4 | | 90 | | 10 | | 0.039 |
| Ex. 5 | | 60 | | 40 | | 0.034 |
| Ex. 6 | | 30 | | 70 | | 0.034 |
| Ex. 7 | | | 90 | 10 | | 0.040 |
| Ex. 8 | | 60 | | 40 | 20 | 0.036 |
| Ex. 9 | | 60 | | 40 | 5 | 0.037 |
| CEx. 1 | | | 100 | | | 0.036 |
| CEx. 2 | 95 | | | 5 | | 0.033 |
| CEx. 3 | 20 | | | 80 | | 0.040 |
| CEx. 4 | | 95 | | 5 | | 0.036 |
| CEx. 5 | | | 95 | 5 | | 0.033 |
| CEx. 6 | | | 25 | 75 | | 0.038 |

| Example (Ex.) or Comparative Example (CEx.) | Desulfurization results | | | | | |
|---|---|---|---|---|---|---|
| | Gas transportability | | S content of molten iron after desulfurization ($S_2$) % | Unit consumption kg/T | Desulfurizing ability ΔS/kg | Desulfurization ratio % |
| | Carrier gas ratio Nl/kg | Injecting pressure kg/cm² | | | | |
| Ex. 1 | 10 | 3.7 | 0.016 | 5.2 | 0.0037 | 54 |
| Ex. 2 | 6 | 3.0 | 0.017 | 5.1 | 0.0041 | 55 |
| Ex. 3 | 4 | 2.8 | 0.014 | 5.5 | 0.0033 | 56 |
| Ex. 4 | 6 | 2.9 | 0.016 | 4.9 | 0.0047 | 59 |
| Ex. 5 | 5 | 2.8 | 0.010 | 4.8 | 0.0050 | 71 |
| Ex. 6 | 4 | 2.7 | 0.013 | 5.1 | 0.0041 | 62 |
| Ex. 7 | 8 | 3.6 | 0.018 | 5.0 | 0.0044 | 55 |
| Ex. 8 | 4 | 2.4 | 0.008 | 5.3 | 0.0053 | 78 |
| Ex. 9 | 4 | 2.6 | 0.006 | 5.6 | 0.0055 | 84 |
| CEx. 1 | 65 | 7.3 | 0.026 | 8.2 | 0.0012 | 28 |
| CEx. 2 | 60 | 6.7 | 0.025 | 6.3 | 0.0013 | 24 |
| CEx. 3 | 4 | 2.7 | 0.031 | 5.8 | 0.0016 | 23 |
| CEx. 4 | 6 | 3.4 | 0.024 | 6.0 | 0.0020 | 33 |
| CEx. 5 | 25 | 4.5 | 0.023 | 6.1 | 0.0016 | 30 |
| CEx. 6 | 4 | 2.9 | 0.026 | 5.6 | 0.0021 | 32 |

TABLE 2

| Example (Ex.) or Comparative Example (CEx.) | Desulfurizer composition | | | | | Desulfurization conditions S content of molten iron before desulfurization ($S_2$) % |
|---|---|---|---|---|---|---|
| | (Quicklime)₂ DL wt. % | Diamide lime wt. % | Synthetic diamide lime wt. % | Carbonaceous material parts by weight | Fluorspar parts by weight | |
| Ex. 10 | 90 | 10 | | | | 0.037 |
| Ex. 11 | 60 | 40 | | | | 0.033 |
| Ex. 12 | 60 | 40 | | 5 | | 0.036 |
| Ex. 13 | 60 | 40 | | | 5 | 0.036 |
| Ex. 14 | 60 | 40 | | 5 | 5 | 0.036 |
| CEx. 7 | 60 | | 40 | | | 0.039 |

| Example (Ex.) or Comparative Example (CEx.) | Desulfurization results | | | | | |
|---|---|---|---|---|---|---|
| | Gas transportability | | S content of molten iron after desulfurization ($S_2$) % | Unit consumption kg/T | Desulfurizing ability ΔS/kg | Desulfurization ratio % |
| | Carrier gas ratio Nl/kg | Injecting pressure kg/cm² | | | | |
| Ex. 10 | 6 | 2.9 | 0.014 | 4.8 | 0.0048 | 62 |
| Ex. 11 | 5 | 2.8 | 0.009 | 4.6 | 0.0052 | 73 |
| Ex. 12 | 4 | 2.6 | 0.005 | 5.4 | 0.0057 | 86 |
| Ex. 13 | 5 | 2.8 | 0.005 | 5.3 | 0.0058 | 86 |
| Ex. 14 | 4 | 2.6 | 0.004 | 5.1 | 0.0063 | 89 |
| CEx. 7 | 21 | 4.3 | 0.024 | 5.5 | 0.0027 | 38 |

As shown in Tables 1 and 2, the powdery desulfurizer compositions of the invention in Examples 1 to 14 did not cause pulsating movement at relatively low injection pressures, and exhibited excellent gas transportability with a carrier gas ratio of less than 10 Nl/kg, and furthermore, they scarcely caused splashing of molten iron from the torpedo ladle. Moreover since the powdery pulverizer composition could be injected at high concentrations, the inherent desulfurizing ability of quicklime was fully utilized. The ratio of desulfurization reacted about 55% to about 85%, and the desulfurized molten iron has a sulfur content of less than 0.01%. These results are difficult to obtain by conventional quicklime-type powdery desulfurizer compositions.

The powdery desulfurizer composition of Example 2 is best in gas transportability and desulfurizing ability among those obtained in Examples 1 to 3. The powdery desulfurizer compositions of Examples 4 to 6 prepared by using (quicklime)₁DL are better than those obtained in Examples 1 to 3, and the desulfurizer composition of Example 5 is better in desulfurizing ability than those of Examples 4 and 6. The composition of Example 7 prepared by using the (quicklime)* was inferior in gas transportability and desulfurizing ability to the composition obtained in Example 4. The powdery desulfurizing compositions obtained in Examples 8 and 9 which contain carbon exhibit especially good gas transportability and desulfurizing ability.

The desulfurizer powder of Comparative Example 1 which consists solely of (quicklime)* has very bad gas transportability and caused vigorous pulsating movement and the splashing of the molten iron, and its desulfurizing ability is so poor as is not feasible in practical applications. With regard to the powdery desulfurizer compositions of Comparative Examples 2, 4 and 5 consisting of 95% by weight of quicklime, (quicklime)₁DL or (quicklime)* respectively and 5% by weight of diamide lime, some improvement is seen in the occurrence of pulsating movement as a result of incorporation of the diamide lime. But the amount of the diamide lime is too small, and pulsating movement still occurs. Moreover, their desulfurizing ability is poor. Hence, the compositions of Comparative Examples 2, 4 and 5 are neither feasible for practical application. The powdery desulfurizer compositions obtained in Comparative Examples 3 and 6 which contain a large amount of the diamide lime have excellent gas transportability. But the proportion of the quicklime is small, and their desulfurizing ability is much inferior to those of the desulfurizer compositions of Examples 1 to 9. Furthermore, since splashing of the molten iron is vigorous, a large amount of the molten iron is lost.

The desulfurizer compositions containing (quicklime)$_2$DL as in Examples 10 and 11 show better desulfurization results than the composition containing (quicklime)$_1$DL, and the compositions of Examples 12 to 14 which further contain a carbonaceous material and/or fluorspar show still better desulfurization results. On the other hand, the composition of Comparative Example 7 containing the synthetic diamide lime instead of diamide lime has poor gas transportability, and gives poor desulfurization results.

REFERENTIAL EXAMPLES 1 AND 2

Desulfurization was performed by using the same desulfurizer composition as in Example 9 under the conditions shown in Table 3. The results are shown in Table 3.

TABLE 3

| Ex. or Ref. Ex. | Gas transporting conditions | | Desulfurization conditions S content in molten iron before desulfurization (%) | Desulfurization results | | | |
|---|---|---|---|---|---|---|---|
| | Carrier gas ratio (Nl/kg) | Blowing pressure (kg/cm$^2$) | | S. content of molten iron after desulfurization (%) | Unit consumption (kg/T) | Desulfurizing ability ($\Delta$S/kg) | Desulfurization ratio (%) |
| Ex. 9 | 4 | 2.6 | 0.037 | 0.006 | 5.6 | 0.0055 | 84 |
| Ref. Ex. 1 | 20 | 2.9 | 0.040 | 0.025 | 5.0 | 0.0030 | 38 |
| Ref. Ex. 2 | 60 | 2.8 | 0.033 | 0.024 | 5.3 | 0.0017 | 27 |

It is seen from Table 3 that the powdery desulfurizing composition obtained in Example 9 which is used at a small carrier gas ratio shows the best desulfurizing performance. As stated hereinabove, the powdery desulfurizing composition shows especially good desulfurizing performance when the carrier gas ratio is not more than 10 Nl per kg of the desulfurizer composition, and this value is suitable for good injection desulfurization.

What we claim is:

1. A powdery desulfurizer composition for injection desulfurization of molten iron, said composition consisting essentially of 30 to 90% by weight of quicklime and 70 to 10% by weight of diamide lime, wherein the quicklime is obtained by calcining diamide lime under an oxygen-excessive atmosphere under conditions such that at least some calcium carbonate and at least some carbon remains in the quicklime, and not more than 20 parts by weight of a carbonaceous material and not more than 8 parts by weight of a desulfurization aid, each per 100 parts by weight of the quicklime and diamide lime, said composition being further characterized by its capability to be transported by a carrier gas at an amount of carrier gas of 6 Nl/Kg or less and by its capability to desulfurize molten iron in an injection desulfurization process using an amount of carrier gas of 6 Nl/Kg or less at a desulfurization ratio of at least about 55%.

2. The composition of claim 1, wherein the quicklime, diamide lime and carbonaceous material have particle diameters of mainly not more than 60 microns.

3. The composition of claim 1 which further contains 2 to 8 parts by weight of a desulfurization aid per 100 parts by weight of the quicklime and diamide lime.

4. The composition of claim 3 wherein the desulfurization aid is fluorspar.

5. The composition of claim 1 which contains from 3 to 15 parts by weight of the carbonaceous material per 100 parts by weight of the quicklime and diamide lime.

6. The composition of claim 1 wherein the amount of quicklime is from 50 to 90% by weight and the amount of diamide lime is from 50 to 10% by weight.

7. The composition of claim 1 wherein the quicklime contains at least 70% by weight of CaO.

8. The composition of claim 1 wherein the quicklime contains at least 90% by weight of CaO.

9. In a method of injection desulfurization which is carried out by fluidizing a powdery desulfurizer composition in a pressure vessel, and injecting said powdery desulfurizer composition into molten iron using a carrier gas the improvement which comprises using the powdery desulfurizer composition of any one of claims 1, 4, 5 or 6, and injecting said powdery desulfurizing composition using said carrier gas in an amount of not more than 6 Nl per kilogram of the powdery desulfurizer composition said molten iron being desulfurized at a desulfurization ratio of at least about 55% and at a unit consumption of the powdery desulfurizer composition of from about 4.6 to about 5.6 Kg/T.

10. The method of claim 9 wherein the powdery desulfurizer composition contains from 3 to 15 parts by weight of the carbonaceous material per 100 parts by weight of the quicklime and diamide lime.

* * * * *

UNITED STATES PATENT AND TRADEMARK OFFICE
CERTIFICATE OF CORRECTION

PATENT NO. : 4,420,333
DATED : December 13, 1983
INVENTOR(S) : TAKAHASHI ET AL.

It is certified that error appears in the above—identified patent and that said Letters Patent is hereby corrected as shown below:

On the title page,
Please correct the Assignee portion of the patent to include

KAWASAKI STEEL CORPORATION of Hyogo-ken, Japan.

Signed and Sealed this

First Day of May 1984

[SEAL]

*Attest:*

*Attesting Officer*

GERALD J. MOSSINGHOFF

*Commissioner of Patents and Trademarks*